(12) United States Patent
Standerfer et al.

(10) Patent No.: US 10,231,391 B2
(45) Date of Patent: Mar. 19, 2019

(54) CENTRAL IRRIGATION CONTROL SYSTEM

(71) Applicant: The Toro Company, Bloomington, MN (US)

(72) Inventors: Paul A. Standerfer, Claremont, CA (US); John F. Fuller, Murrieta, CA (US); Stanley C. Campbell, Riverside, CA (US)

(73) Assignee: The Toro Company, Bloomington, MN (US)

( * ) Notice: Subject to any disclaimer, the term of this patent is extended or adjusted under 35 U.S.C. 154(b) by 356 days.

(21) Appl. No.: 14/923,266

(22) Filed: Oct. 26, 2015

(65) Prior Publication Data

US 2016/0050860 A1    Feb. 25, 2016

Related U.S. Application Data

(63) Continuation of application No. 13/208,249, filed on Aug. 11, 2011, now Pat. No. 9,192,110.

(60) Provisional application No. 61/372,814, filed on Aug. 11, 2010.

(51) Int. Cl.
   *A01G 25/16*     (2006.01)
   *G05B 19/10*     (2006.01)

(52) U.S. Cl.
   CPC .......... *A01G 25/165* (2013.01); *A01G 25/16* (2013.01); *G05B 19/102* (2013.01); *G05B 2219/2625* (2013.01)

(58) Field of Classification Search
   CPC .... A01G 25/162; A01G 25/165; A01G 25/16; G05B 19/102; G05B 2219/2625; B05B 12/00
   See application file for complete search history.

(56) References Cited

U.S. PATENT DOCUMENTS

| | | | |
|---|---|---|---|
| 4,014,359 A | 3/1977 | Sanner | |
| 4,015,366 A | 4/1977 | Hall, III | |
| 4,130,382 A | 12/1978 | Bode | |
| 4,244,022 A | 1/1981 | Kendall | |
| 4,646,224 A * | 2/1987 | Ransburg | A01G 25/16 137/624.18 |
| 4,856,227 A | 8/1989 | Oglevee et al. | |
| 4,858,377 A | 8/1989 | Oglevee et al. | |
| 5,023,787 A | 6/1991 | Evelyn-Veere | |
| 5,097,861 A | 3/1992 | Hopkins et al. | |
| 5,208,855 A | 5/1993 | Marian | |
| 5,229,937 A | 7/1993 | Evelyn-Veere | |
| 5,272,620 A | 12/1993 | Mock et al. | |
| 5,355,122 A | 10/1994 | Erickson | |
| 5,381,331 A | 1/1995 | Mock et al. | |
| 5,444,611 A | 8/1995 | Woytowitz et al. | |

(Continued)

*Primary Examiner* — Charles R Kasenge
(74) *Attorney, Agent, or Firm* — Inskeep IP Group, Inc.

(57) ABSTRACT

In one embodiment of the present invention, irrigation software is provided for an irrigation system. The irrigation software may include a hierarchical watering plan display, water pump adjustment, water pump efficiency profile use, a soil moisture interface, a historical flow interface, a demand ET interface, an instant program interface, an instant program interface, a manual irrigation interface, a precipitation management group interface, a rain schedule adjustment algorithm, a map-to-monitor button, a universal start time shift interface, and a conditional screen saver.

12 Claims, 17 Drawing Sheets

(56) References Cited

U.S. PATENT DOCUMENTS

| | | |
|---|---|---|
| 5,479,339 A | 12/1995 | Miller |
| 5,668,719 A | 9/1997 | Bobrov et al. |
| 5,696,671 A | 12/1997 | Oliver |
| 5,839,660 A | 11/1998 | Morgenstern et al. |
| 5,870,302 A | 2/1999 | Oliver |
| 6,076,740 A | 6/2000 | Townsend |
| 6,145,755 A | 11/2000 | Feltz |
| 6,276,298 B1 | 8/2001 | Welsh |
| 6,298,285 B1 | 10/2001 | Addink et al. |
| 6,314,340 B1 | 11/2001 | Mecham et al. |
| 6,343,255 B1 | 1/2002 | Peek et al. |
| 6,453,216 B1* | 9/2002 | McCabe ................ A01G 25/16 700/284 |
| 6,585,168 B1 | 7/2003 | Caprio |
| 6,675,098 B2 | 1/2004 | Peek et al. |
| 6,782,311 B2 | 8/2004 | Barlow et al. |
| 6,823,239 B2* | 11/2004 | Sieminski ............ A01G 25/167 239/69 |
| 6,850,819 B1 | 2/2005 | Townsend |
| 7,229,026 B2 | 6/2007 | Evelyn-Veere |
| 2001/0049563 A1 | 12/2001 | Addink et al. |
| 2002/0010516 A1 | 1/2002 | Addink et al. |
| 2002/0014539 A1 | 2/2002 | Pagano et al. |
| 2002/0020441 A1 | 2/2002 | Addink |
| 2002/0029111 A1 | 3/2002 | Peek et al. |
| 2002/0166898 A1 | 11/2002 | Buhler et al. |
| 2002/0183935 A1 | 12/2002 | Skinner |
| 2003/0093159 A1 | 5/2003 | Sieminski |
| 2003/0109964 A1 | 6/2003 | Addink et al. |
| 2003/0179102 A1 | 9/2003 | Barnes |
| 2003/0182022 A1 | 9/2003 | Addink et al. |
| 2003/0208306 A1 | 11/2003 | Addink et al. |
| 2004/0003045 A1 | 1/2004 | Tucker et al. |
| 2004/0011880 A1 | 1/2004 | Addink et al. |
| 2004/0015270 A1 | 1/2004 | Addink et al. |
| 2004/0039489 A1 | 2/2004 | Moore et al. |
| 2004/0089164 A1 | 5/2004 | Addink et al. |
| 2005/0082382 A1* | 4/2005 | Evelyn-Veere ...... A01G 25/167 239/63 |
| 2007/0016334 A1* | 1/2007 | Smith ................... A01G 25/16 700/284 |
| 2008/0157995 A1* | 7/2008 | Crist ..................... A01G 25/16 340/4.21 |
| 2009/0099701 A1* | 4/2009 | Li .......................... A01G 25/16 700/284 |
| 2010/0010682 A1* | 1/2010 | Cardinal ............. A01G 25/167 700/284 |
| 2012/0036091 A1* | 2/2012 | Cook .................... G06Q 50/06 705/412 |

* cited by examiner

CENTRAL IRRIGATION CONTROL SYSTEM

RELATED APPLICATIONS

This application is a continuation of an claims priority to U.S. patent application Ser. No. 13/208,249 filed Aug. 11, 2011 entitled Central Irrigation Control System, which claims priority to U.S. Provisional Application Ser. No. 61/372,814 filed Aug. 11, 2010 entitled Central Irrigation Control System, the contents of both of which are incorporated in their entireties herein.

BACKGROUND OF THE INVENTION

Large irrigation systems typically include a central irrigation controller that is responsible for a variety of tasks associated with operation of the irrigation system. Such central controllers are typically software-based systems executed on a local computer system.

The central controller software is typically responsible for planning watering schedules and monitoring operation of the irrigation system. Watering commands or irrigation schedules are typically communicated to a plurality of satellite controllers at various locations on the site. The satellite controllers are connected to valves either in each of the sprinklers or a valve connected to sprinklers or groups sprinklers and can thereby direct each of the sprinklers to water according to the watering schedule.

SUMMARY OF THE INVENTION

In one embodiment of the present invention, irrigation software is provided for an irrigation system. The irrigation software may include a hierarchical watering plan display, water pump adjustment, water pump efficiency profile use, a soil moisture interface, a historical flow interface, a demand evapotranspiration (ET) interface, an instant program interface, a manual irrigation interface, a precipitation management group interface, a rain schedule adjustment algorithm, a map-to-monitor button, a universal start time shift interface, and a conditional screen saver.

BRIEF DESCRIPTION OF THE DRAWINGS

These and other aspects, features and advantages of which embodiments of the invention are capable of will be apparent and elucidated from the following description of embodiments of the present invention, reference being made to the accompanying drawings, in which.

DESCRIPTION OF EMBODIMENTS

Figure 1:
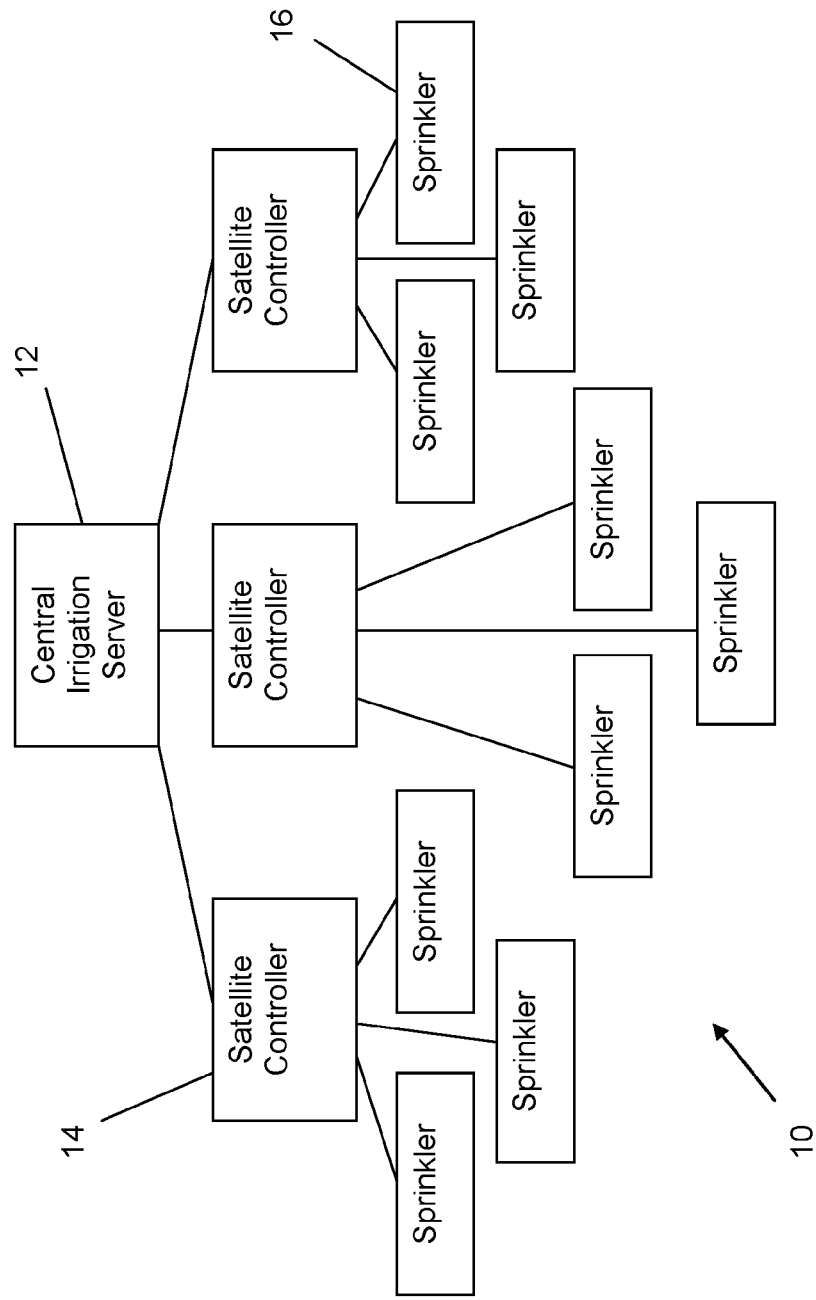
FIG. 1 illustrates an irrigation system for use with the present invention.

Specific embodiments of the invention will now be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

FIGS. 1-16 illustrate various aspects of irrigation control software according to the present invention. Preferably, this control software is located on and executable by a computer. FIG. 1 illustrates an example irrigation system 10 having a central irrigation server 12, such as a PC, which is in communication (e.g., wired or wireless) with a plurality of satellite controllers 14. Each satellite controller is connected to a valve in a sprinkler 16, thereby directly controlling when each sprinkler 16 waters. The central irrigation server 12 communicates watering schedule information to the appropriate satellite controller 14 and the satellite controller 14 operates its connected sprinklers 16 according to this watering schedule.

The central irrigation server 12 may alternately operate over a two-wire encoder/decoder network in which the server 12 is directly connected to each sprinkler 16 via two wires, as is known in the art. These wires provide power and communication signals for a decoder at each sprinkler valve. In this respect, each sprinkler 16 is directly controlled.

Preferably, the irrigation control software is executed by the central irrigation server 12 and stores data (e.g., in a database) in a locally attached storage device. Alternately, the irrigation control software can be executed and stored on a remote server and displayed on the central irrigation server 12 via a webpage over the internet.

Hierarchical Watering Plan Display

Figure 2:
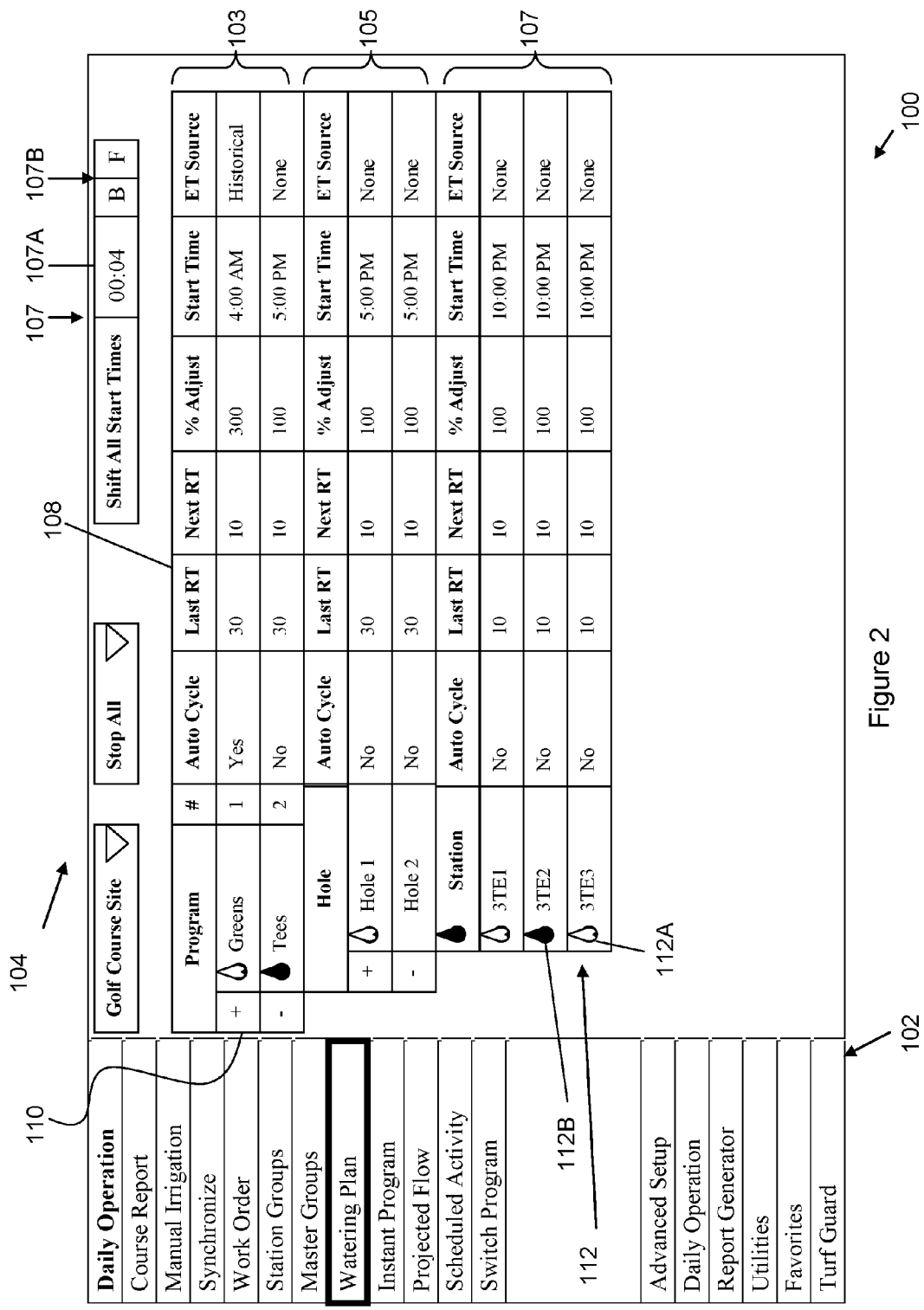
FIG. 2 illustrates a view of an irrigation software display according to a preferred embodiment of the present invention.

FIG. 2 illustrates a watering plan interface 100 of the central control software that uses a hierarchical display to provide both top-level or summary information and more detailed information about specific watering programs or schedules. More specifically, the watering plan interface allows for selectable visual expansion of various subcategories of an irrigation program.

In the specific example shown in FIG. 2, the watering plan action is selected from the action menu 102, which causes the watering plan interface 104 to display. The interface 104 includes a top-level information display 103 for each program comprising a plurality of information or control columns 108. For example, these columns may include a program name, program number, auto cycle control, last runtime, last inches of water applied, next inches of water to be applied, percentage adjust, program start time, priority level, active days, run time calculation adjustments, evapotranspiration mode, evapotranspiration source, reference evapotranspiration value, rainfall amount and a soil moisture sensor value (e.g., from a Turf Guard™ sensor).

The top level information display 103 also includes a "plus/minus" expansion symbol 110 that allows the user to expand or hide subcategories of the main program (e.g., the plus symbol indicates that expansion can occur and the minus symbol indicates that a subcategory is expanded). In the example of FIG. 2, the first subcategory tier 105 illustrates geographic areas that are watered with the program, such as holes of a golf course. This first subcategory tier 103 preferably includes the same or similar columns 108 as the top level program 103. Additionally, each first subcategory tier 105 can include its own selectively expandable second subcategory tier 107, which, in the present example, refers to individual sprinklers residing on the selected hole, a sub set of the selected area.

While not shown, it is possible to add yet additional expandable subcategories under each station displaying information for each sprinkler connected to a specific satellite station. For example, sprinkler column information may include a sprinkler popup indicator, nozzle rotation indicator and a sprinkler water flow indicator.

Figure 3:
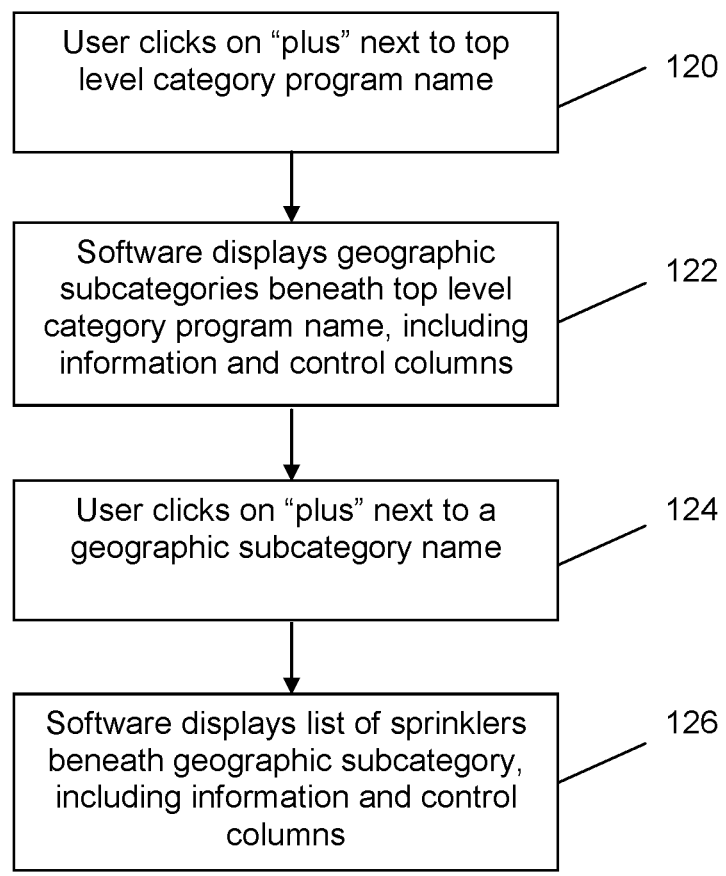
FIG. 3 illustrates a flow chart for navigating a hierarchical interface according to the present invention.

As seen in the operation flow chart of FIG. 3, the user clicks on the "plus" sign 110 next to a specific top level category 103 program name 120. This action causes the software to display a list of geographic subcategories in the first subcategory tier 105 beneath the top level category program name, including information and control columns 108 associated with the subcategory entries 122. The user clicks on the "plus" 110 next to a geographic subcategory name 124. This action causes the software to display a list of sprinklers beneath the geographic subcategory entry in the second subcategory tier 107, including information and control columns 108 associated with each entry 126.

As best seen in FIG. 2, the top level program information also includes a colored indicator 112A and 112B that identifies problems or proper functioning of an irrigation program. In the example of FIG. 2, a white rain drop-shaped indicator 112A indicates proper functionality and a black rain drop-shaped indicator 112B indicates a problem with the irrigation schedule or various components. The indicators 112A and 112B may alternately display a solid color, such as green or red, or a mixed color, such as part green and part red.

In this respect, the top level indicator can indicate if all areas and stations in the subcategories beneath it are operating properly (e.g., color is all green or white 112A), one or more stations have errors or failed to water (e.g., color is partially green and red or black and white), or all areas and stations have errors or failed to water (e.g., color is all red). Each sub category can have similar indicators, identifying errors or proper functioning of that specific subcomponent. Thus, a user can selectively view each subcategory to determine where an error warning is being generated.

Figure 4:
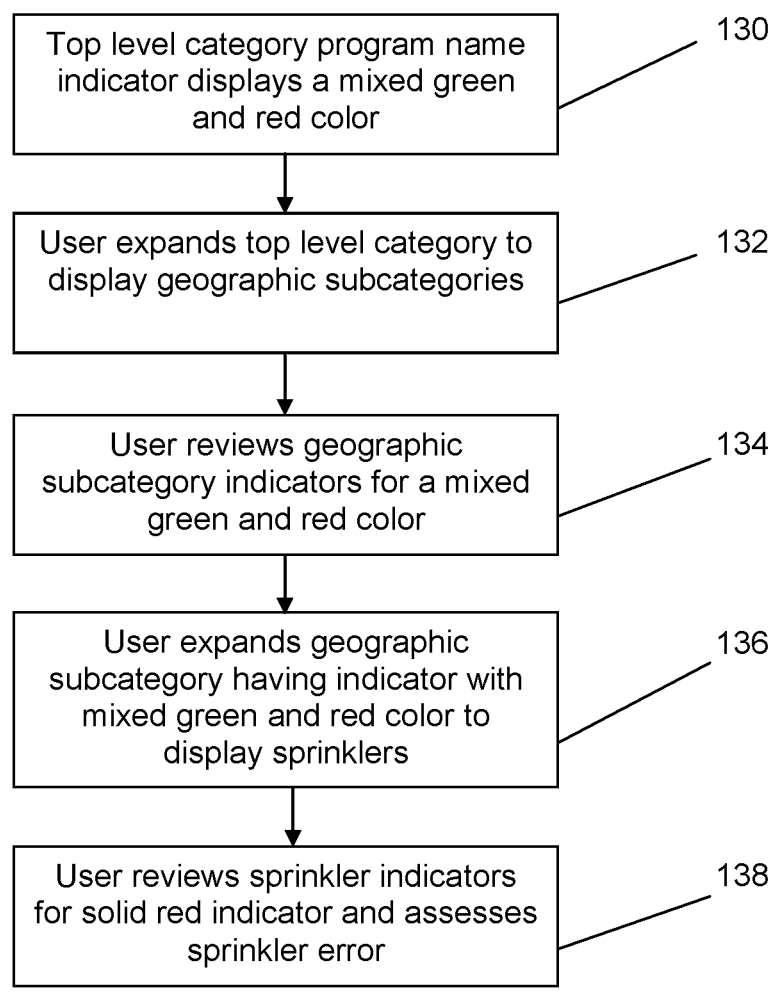
FIG. 4 illustrates a flow chart for navigating a hierarchical interface according to the present invention.
Figure 5:
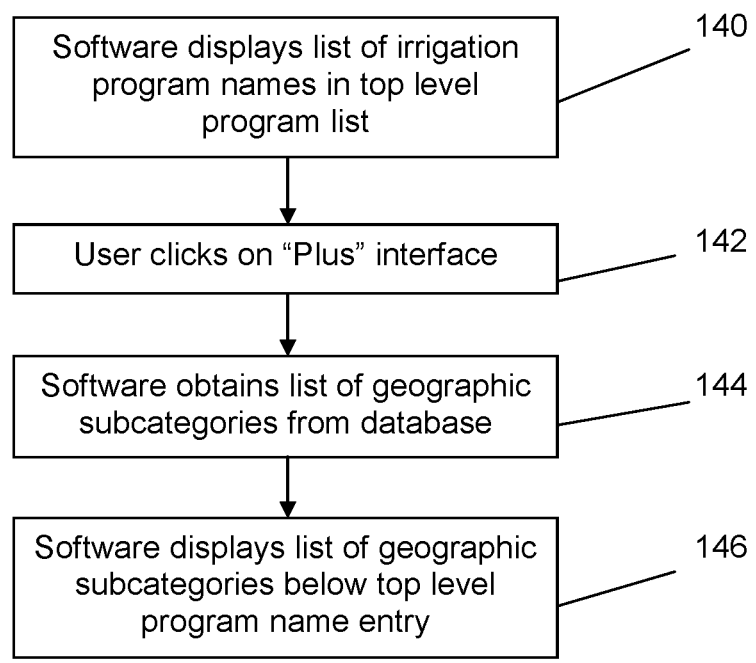
FIG. 5 illustrates a flow chart for navigating a hierarchical interface according to the present invention.

As seen in the operational flow chart of FIG. 4, a problem with a component of the irrigation system 10 used in an irrigation schedule causes the software to display a mixed green and red color in the rain drop-shaped indicator 112, seen in 130. In 132, the user clicks on the plus expansion symbol 110 of the top level tier 103 to expand the first subcategory tier 105. In 134, the user reviews the geographic areas of the first subcategory tier 105 and determines which areas have a red or problem indicator 112 associated with them. In 136, the user expands the sprinkler subcategory of the second subcategory tier 107 and in 138 reviews stations or sprinklers that have a red or problem indicator 112. Once the stations or sprinklers with errors have been identified by the user, corrective action can be performed to address the problem.

Water Pump Adjustments

Figure 6:
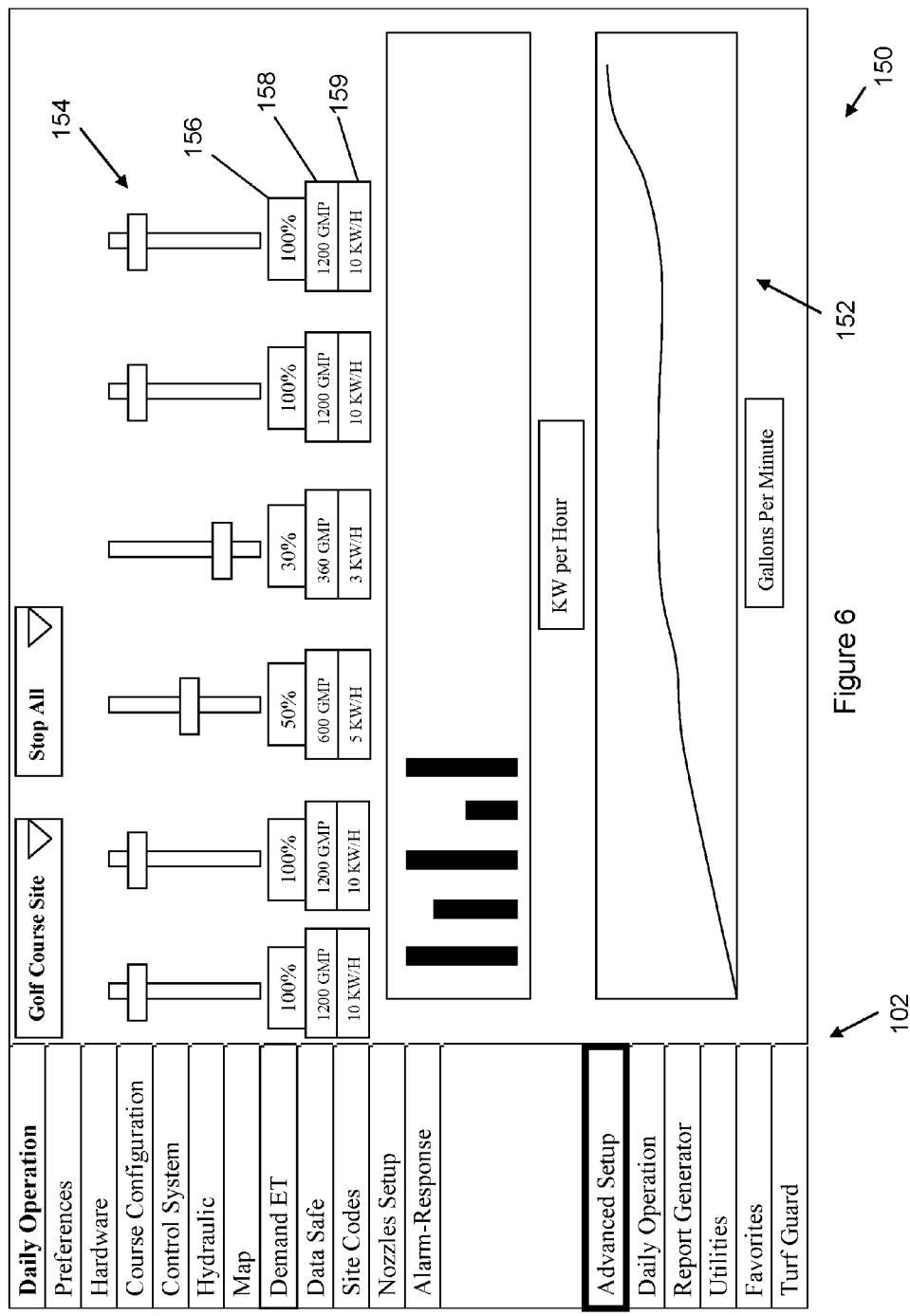
FIG. 6 illustrates a view of an irrigation software display according to a preferred embodiment of the present invention.

FIG. 6 illustrates a water pump adjustment interface 150 that displays water pump usage graphs 152 and adjustable limits 154 (e.g., sliders) on the amount of water flow a pump can deliver. The sliders 154 of the pump preferably display a percentage of the pump output 156, a limit amount in gallons per minute 158 and an electricity amount in kilowatts per hour 159. Hence, the user can limit a pump output based on water flow and or electricity usage.

Figure 7:
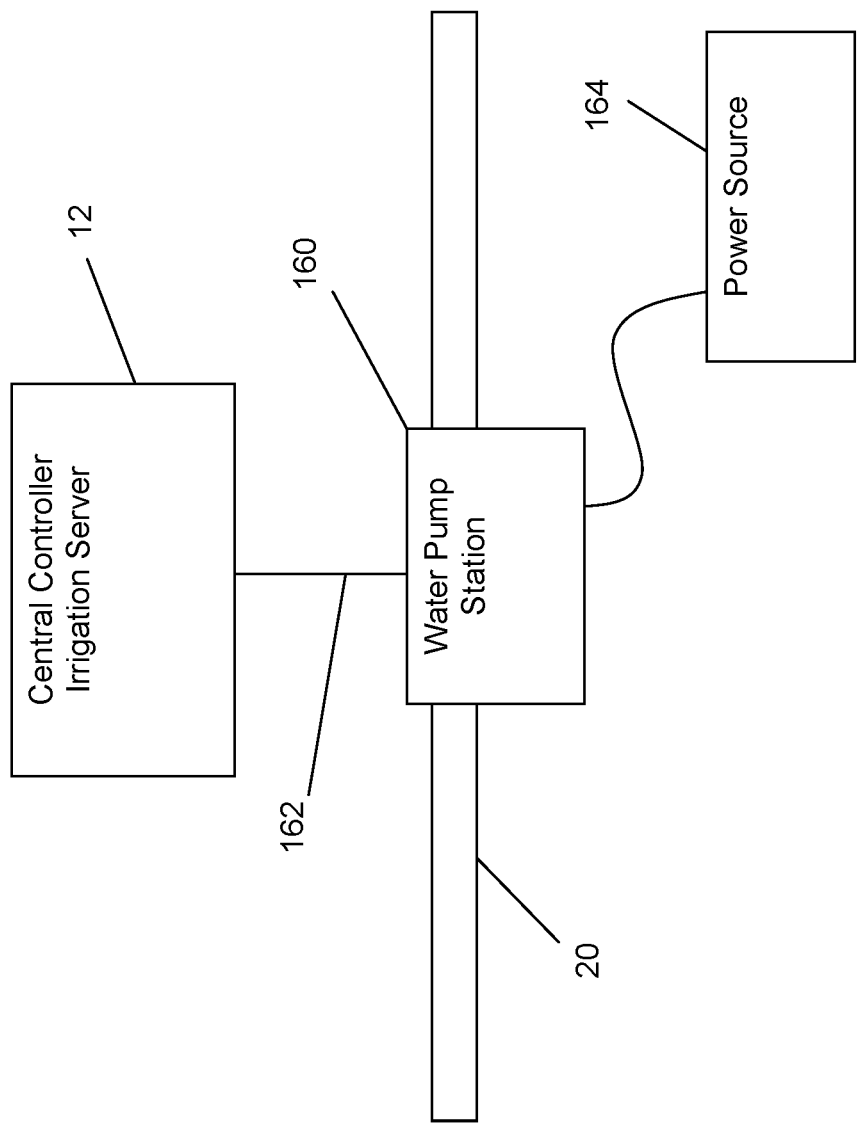
FIG. 7 illustrates a view of a water pump station in communication with a server according to the present invention.
Figure 8:
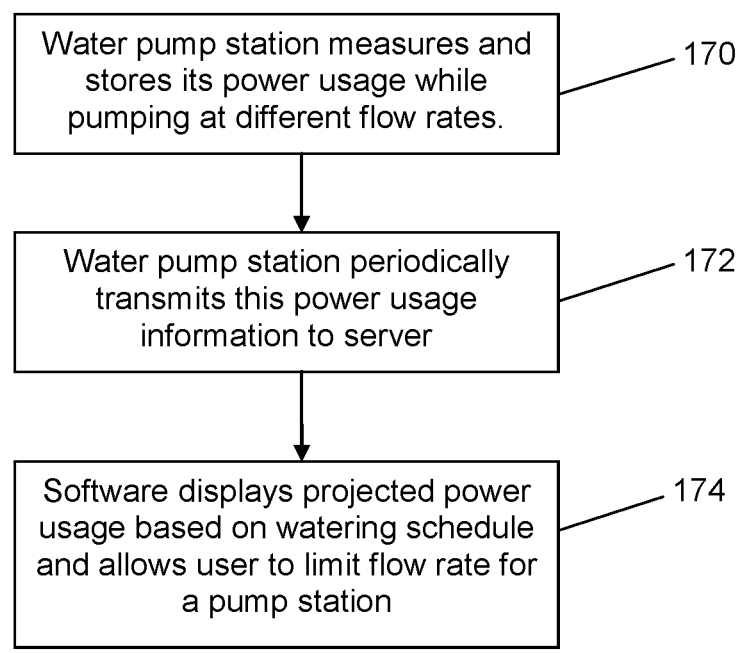
FIG. 8 illustrates a flow chart of a method for monitoring and using efficiency profiles for a water pump.

As seen in FIG. 7 and the flow chart of FIG. 8, the central controller server is preferably connected to a water pump station 160 (e.g., an ITT Flowtronex pump system with Nexus communication capability) via wired or wireless communications line 162 to obtain data for the water pump adjustment interface (step 170). The water pump station 160 measures and stores its power usage from a power source 164 at different flow rates (i.e., different rates that water is pumped through the pump station 160 and through water line 20, step 172). In this respect, the pump station 160 creates and maintains a power efficiency profile for the pump 160 and then communicates this information to the central controller software. Since the efficiency of pump stations 160 tends to change over time (e.g., become less efficient at certain pump speeds with wear, tear, dirt, etc.), the efficiency profile is periodically sent to the central controller software.

In step 174, the software stores the efficiency profile data (e.g. in a database) and displays the corresponding data on the water pump adjustment interface 150. Returning to FIG. 6, the power efficiency profile data can be displayed in the KW/hour display 159 that is associated with each slider 154, displaying rate of power usage and the cost of the power usage (assuming an electricity rate cost is known). As the user adjust the slider 154 upward or downward to modify the flow rate, the KW/hour display 159 changes according to the pump profile. Additionally, the pump usage graphs can display data on the efficiency profile data in a variety of different ways, such as the rate, cost or total amount of electricity for a desired amount of time. In this respect, the power usage and electric cost for an irrigation schedule can be directly managed.

Soil Moisture Sensor Data

The central controller software can accept data from a plurality of soil moisture sensors located on the irrigated turf. This soil moisture data can be stored on the server 12 that executes the central controller software or other locations.

Figure 9:
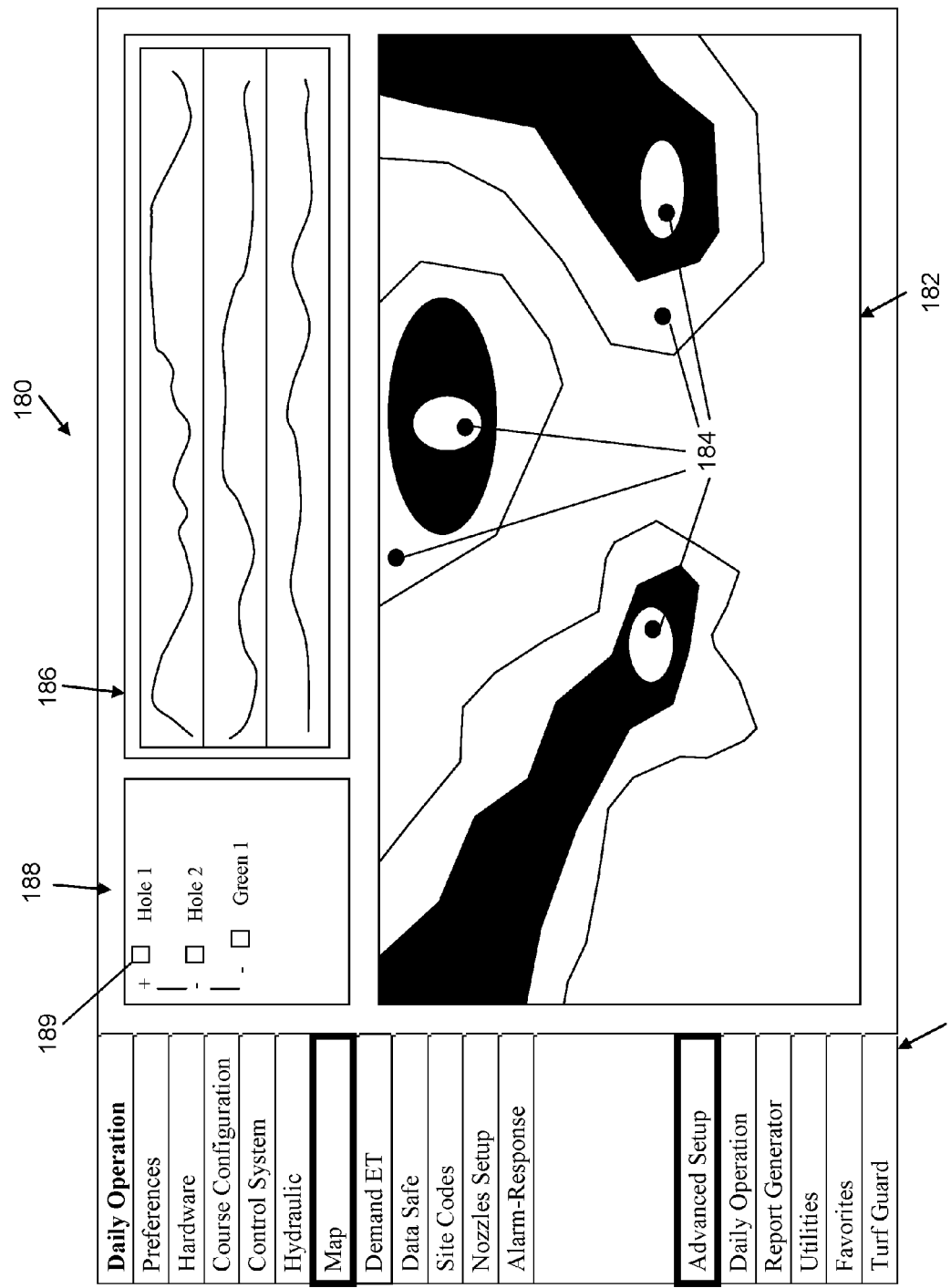
FIG. 9 illustrates a view of an irrigation software display according to a preferred embodiment of the present invention.

FIG. 9 illustrates a soil moisture interface 180 for selectively displaying soil moisture data from the plurality of soil moisture sensors. For example, the user can select which moisture sensor's data is displayed by selecting check boxes 189 in a hierarchical list display 188 of available moisture sensors. Data from selected moisture sensors can be displayed in a variety of different graphs, such as those in graph display 186, that illustrates several moisture history levels, temperature history levels and salinity history levels. A map display 182 can also display the relative location of each moisture sensor by displaying moisture sensor icons 184, based on which check box 189 is checked. Additionally, both the moisture level and an irrigation schedule can be displayed on a single graph, allowing a user to compare the alignment of the moisture level with the irrigation schedule.

Figure 10:
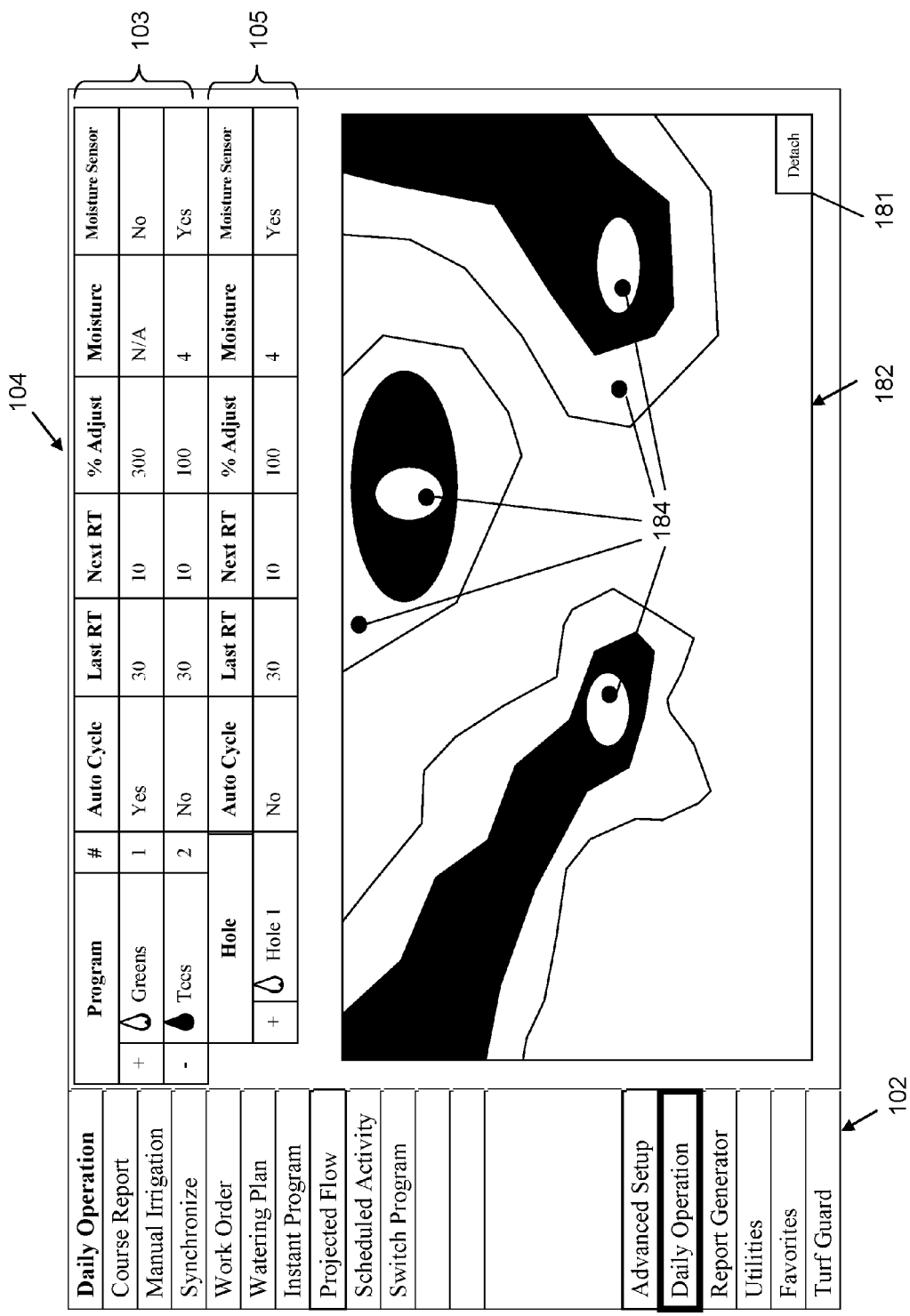
FIG. 10 illustrates a view of an irrigation software display according to a preferred embodiment of the present invention.

As seen in FIG. 10, the watering plan interface 104 and map display interface 182 can also be displayed simultaneously, allowing the user to view the irrigation schedule and the relative locations of soil moisture sensors (or other map items, such as sprinklers).

Flow Interface

Figure 11:
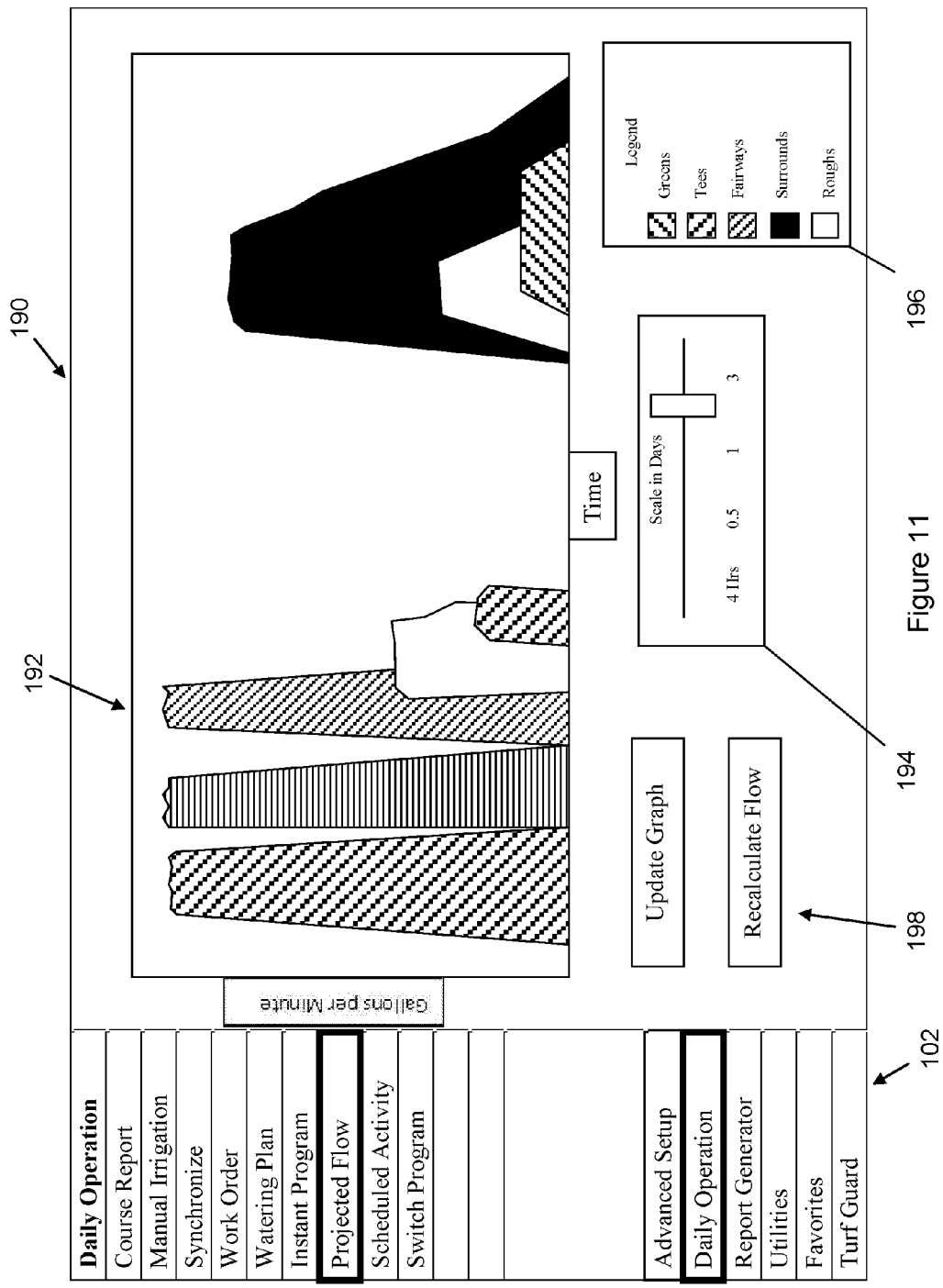
FIG. 11 illustrates a view of an irrigation software display according to a preferred embodiment of the present invention.

As seen in FIG. 11, the central control software also includes a flow interface 190 that displays a flow graph 192 showing past flow (i.e., historical water flow) and future flow according to the watering schedule. Preferably, this flow data is presented in a multicolored graph where each color represents flow from different geographic locations, watering stations, satellite controllers or sprinklers as seen in the legend box 196.

In one example, the graph 192 graphs the gallons per minute versus the time. The scale interface 194 allows a user to adjust the scale of time on the graph 192 while the interface buttons 198 control graph updates and flow recalculations. Alternately, this graph 192 can be displayed on the same page as the watering plan interface 104, allowing a user to view past watering activity, compare this activity to the irrigation schedule (e.g., to see if a prior user made manual watering applications), and see future planned water flow activity.

Demand ET Interface

Preferably, the irrigation software includes a demand evapotranspiration (ET) interface that allows a user to input various ET data such as maximum demand ET, total area, water allotment, manual ET value, low temperature, high temperature, and historic ET values per month. This allows the user to limit and customize the maximum amount of water than can be added to an irrigation schedule due to ET values.

Instant Program Interface

Figure 12:
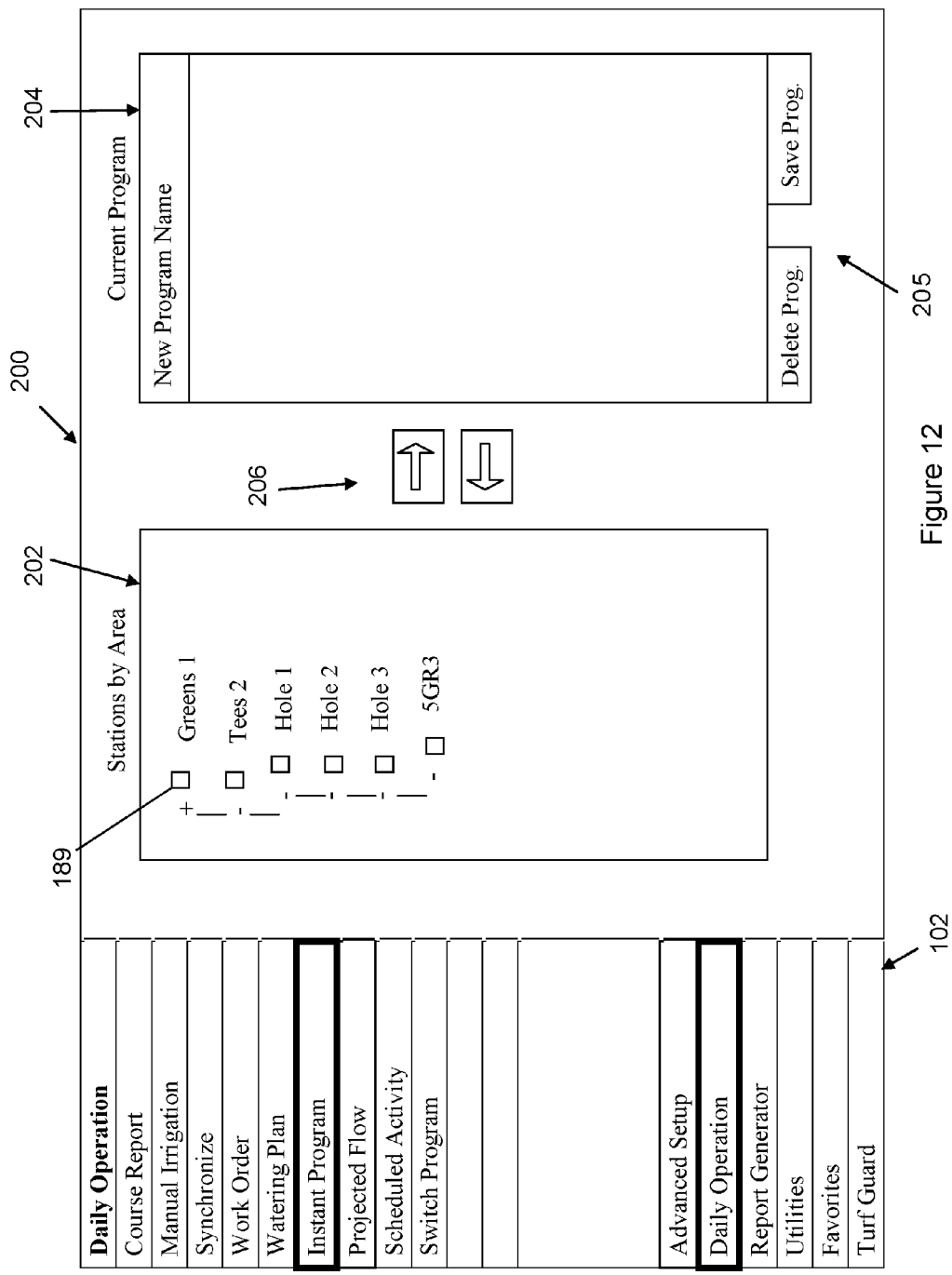
FIG. 12 illustrates a view of an irrigation software display according to a preferred embodiment of the present invention.

FIG. 12 illustrates an instant program interface 200 which allows a user to create a new watering program via a hierarchical interface 202 to run immediately or at a later date. Specifically, watering stations are shown in the hierarchical interface 202 (which operates similarly to interface 108) based on geographic location (e.g., golf course hole). The user can use checkboxes 189 to select irrigation stations and then use arrows 206 to move the stations over to the current program window 204. Once the user has added all of the desired stations, the current program window 204, the program can be named and either saved or deleted via interface buttons 205. Once saved, the program can be set to run immediately or at a future date.

Manual Irrigation

Figure 13:
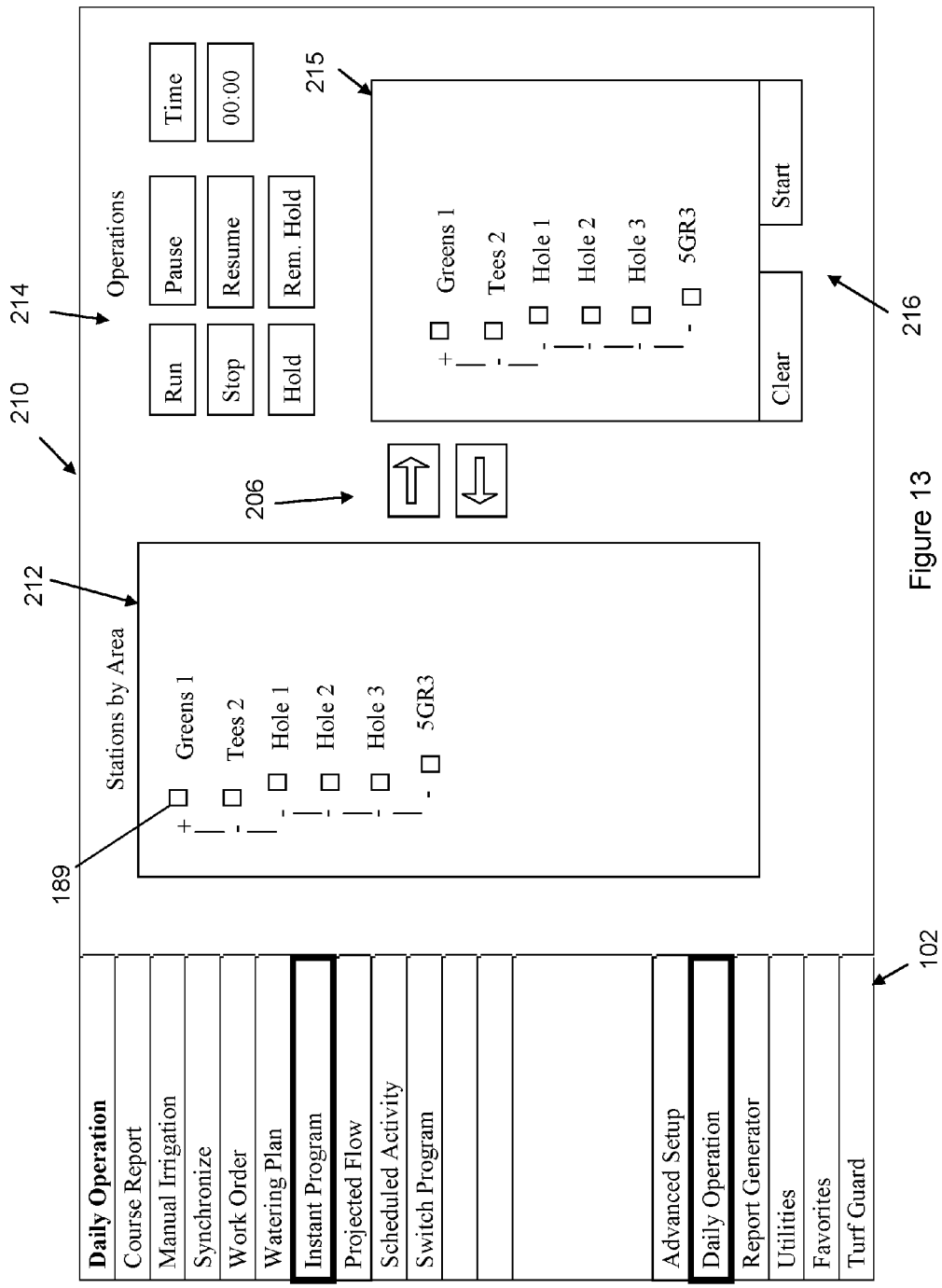
FIG. 13 illustrates a view of an irrigation software display according to a preferred embodiment of the present invention.

FIG. 13 illustrates a manual irrigation interface 210 that allows a user to manually activate specified irrigation stations (e.g., satellite stations) and their associated sprinklers. The user can make a station selection via a selection area 212 (similar to previously described selection area 202 with checkboxes 189) which provides a hierarchical display 212 based on various aspects such as types of areas (e.g., golf tees, fairways, holes, etc.).

Once selected, the interface buttons 206 can be used to copy the selected stations to the manual program window 215 where various program actions can be selected via program buttons 214 (e.g., run, pause, stop, resume, hold, remove hold and length of runtime). Finally, the buttons 216 can be used to start or clear the program.

Precipitation Management Groups

Figure 14:
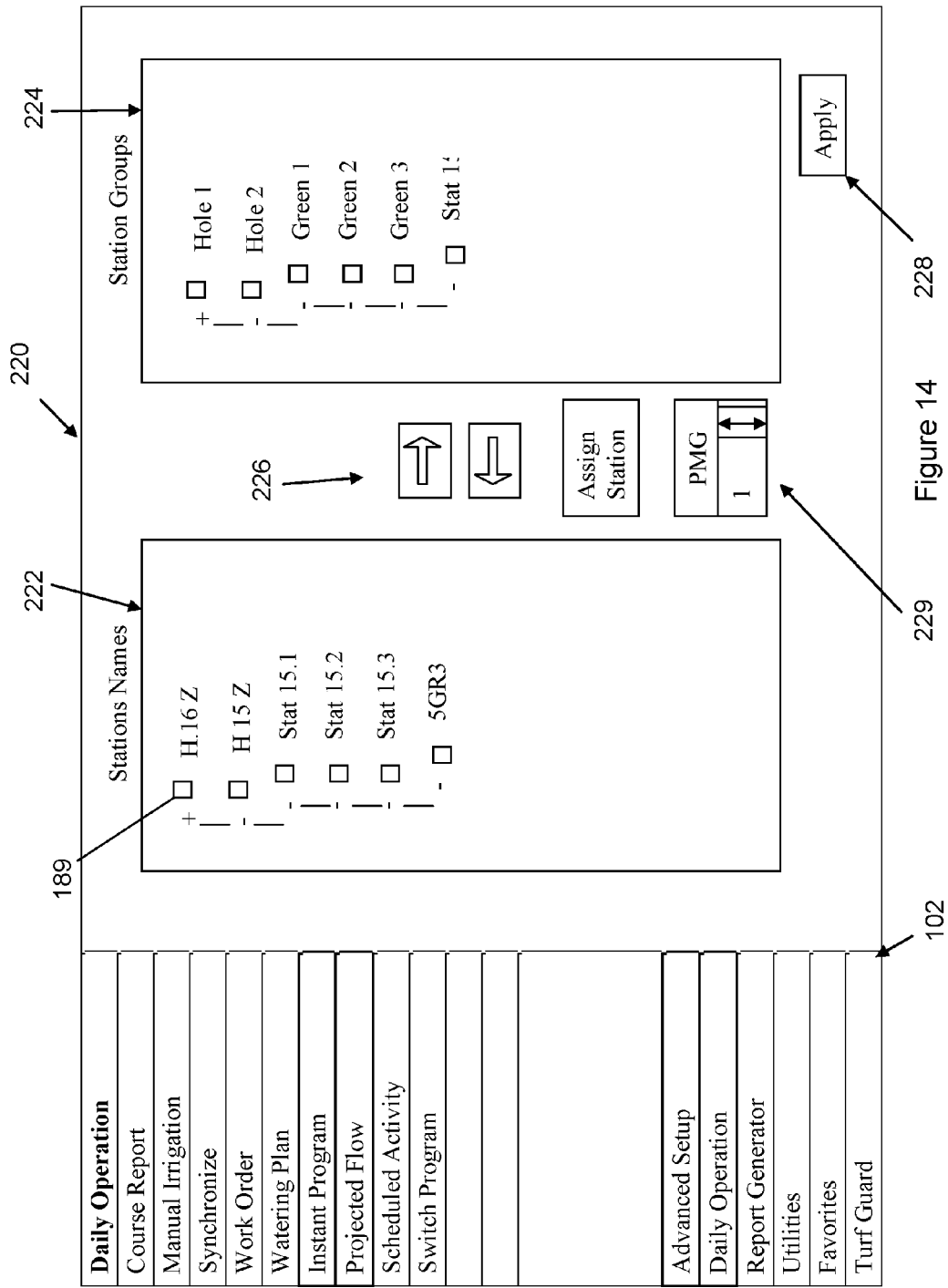
FIG. 14 illustrates a view of i an irrigation software display according to a preferred embodiment of the present invention.

FIG. 14 illustrates a station group interface 220 that allows a user to create a group of irrigation stations that are associated with each other (such as golf greens, holes, roughs or other geographic locations). In this respect, groups of stations can be programmed or adjusted together.

Stations are shown in hierarchical station display 222, allowing for individual selection via checkboxes 189. Once selected, the stations can be added, removed or assigned to a group via buttons 226 and will display in a hierarchical station group display 224. When the station groupings are properly arranged, the user can a group name in the desired station group display 224 and apply the groupings with the apply button 228.

Stations may also be assigned a Precipitation Management Group number via the number increment interface 229 that is used by the flow management routine of the irrigation software to manage the application rate of water. This control is used to limit stations from running at the same time as other stations. In this respect, the rate of precipitation for multiple sprinklers from a geographic area can be fine-tuned to reduce possible runoff of the water (i.e., delivering water faster than the turf can absorb).

Rain Schedule Adjustment

Figure 15:
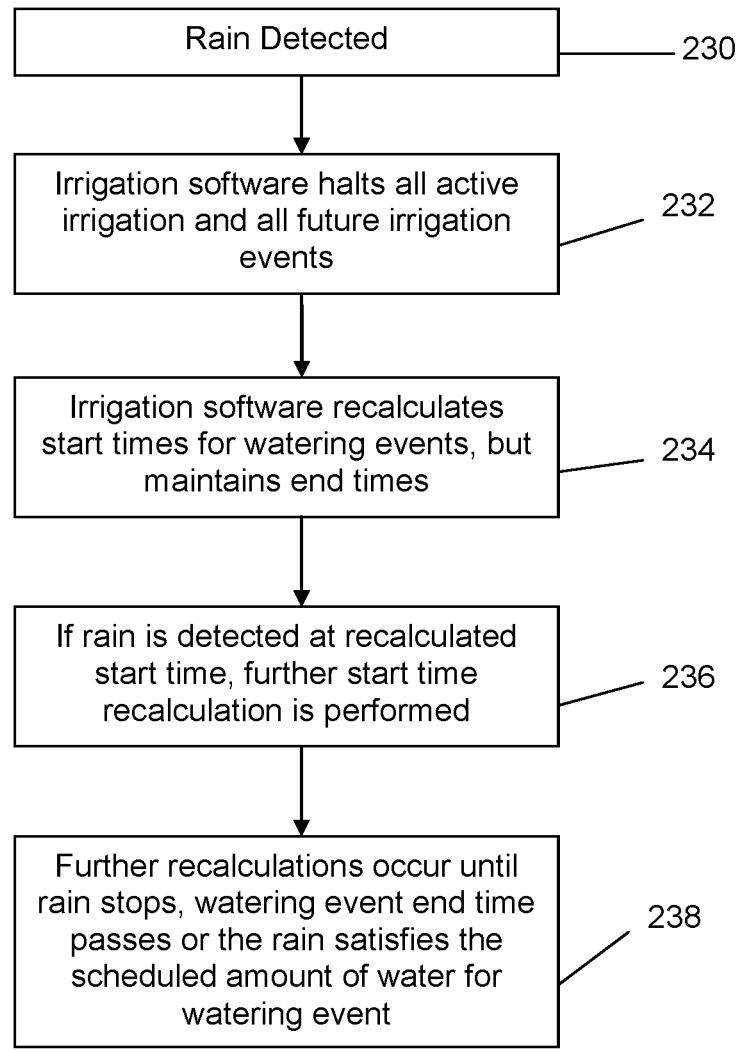
FIG. 15 illustrates a method of recalculating irrigation schedule run times according to the present invention.

Preferably, the central controller software also includes a feature to adjust or delay an irrigation schedule in the event of rain as seen in the flow chart of FIG. 15. In 230, rain is detected (e.g., by a rain sensor or weather station in communication with the server 12).

In 232, any active watering events (i.e., a length of time a station is programmed to irrigate) of the irrigation schedule are terminated. All future watering events have their start time immediately and periodically recalculated to a later time, but the end time of each irrigation event of the irrigation schedule is maintained, as seen in 234. Preferably, this calculation reduces the scheduled duration of the irrigation events based on an amount equal to the rain fall that has been received at that point in time. For example, if one inch of rain has fallen, the irrigation event's start time is reduced by an amount of time equal to irrigate one inch of rain.

If the rain is still falling at the recalculated start time for a watering event in the schedule, the start time (but not the end time) is further recalculated to a later time and the duration of the watering event is further reduced, as seen in 236. As seen in 238, this pattern continues until the rain stops, the originally scheduled duration has been completely satisfied by the received rain fall or the "anchored" irrigation end time passes.

Map to Second Monitor Button

As seen in FIG. 10, the irrigation software interface includes a map detachment button 181 that removes or hides the map display 182 from the current interface view and displays the map display 182 on a second monitor connected to the same server 12. In other words, the map detachment button causes the map display 182 to "move over" to a second monitor that may be attached to the server 12. This function allows a user to view a greater amount of data from another interface (e.g., watering plan interface 104) which may span the entire first monitor, while the entire second monitor can display the geographic irrigation map.

Start Time Shift

Returning to FIG. 2, the irrigation software preferably includes a start time shift interface 107 that allows a user to shift the start times for all watering events for a schedule forward or backward in time. The interface 107 preferably includes a time input window for specifying the amount of time to shift all watering events and forward/backward buttons 107B for executing forward or backward time shift. Hence, the user can easily and quickly shift all watering event times without directly modifying the relatively complex irrigation schedule.

Conditional Screen Saver

Figure 16:
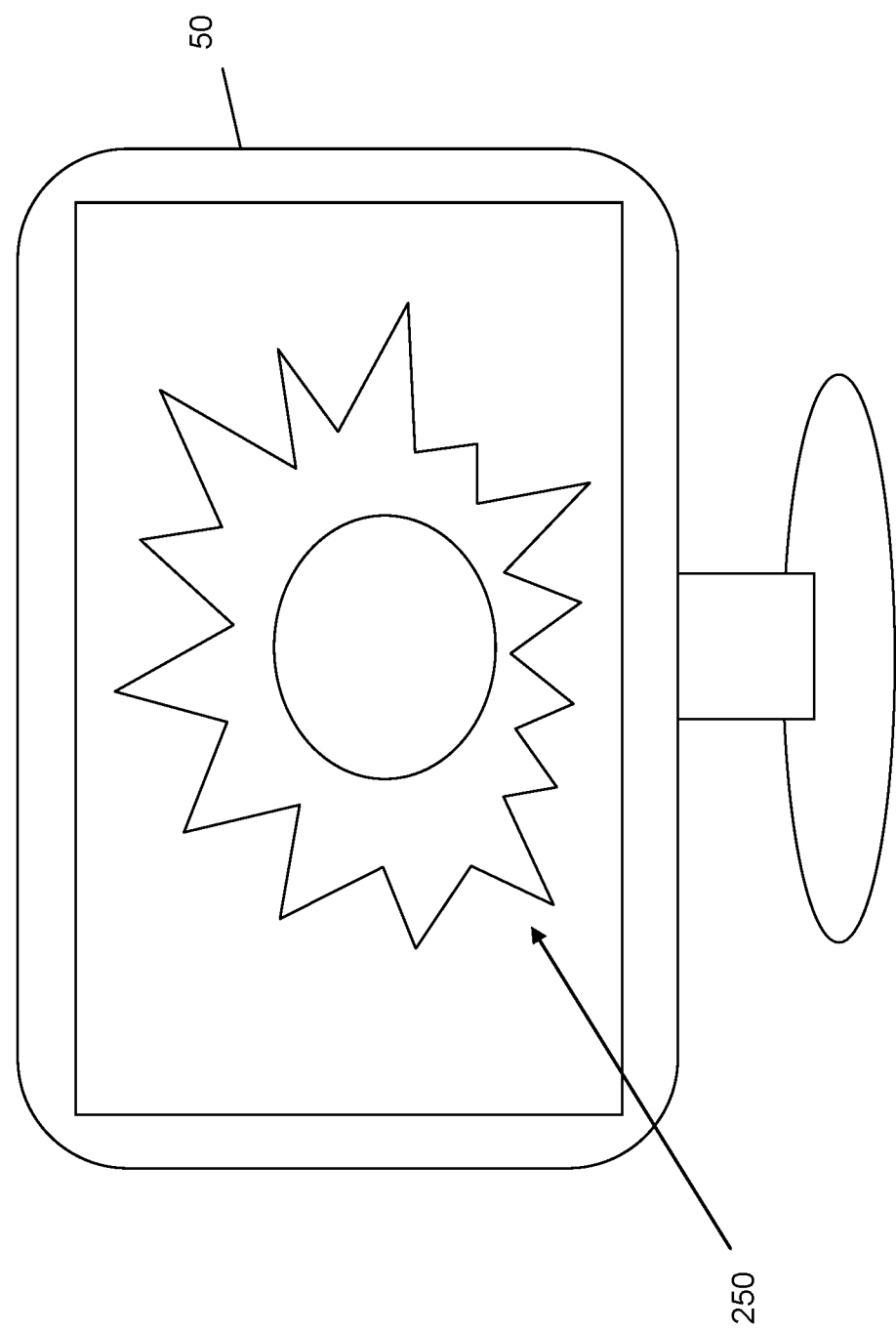
FIGS. 16 and 17 illustrate a computer monitor and a screen saver according to the present invention.
Figure 17:
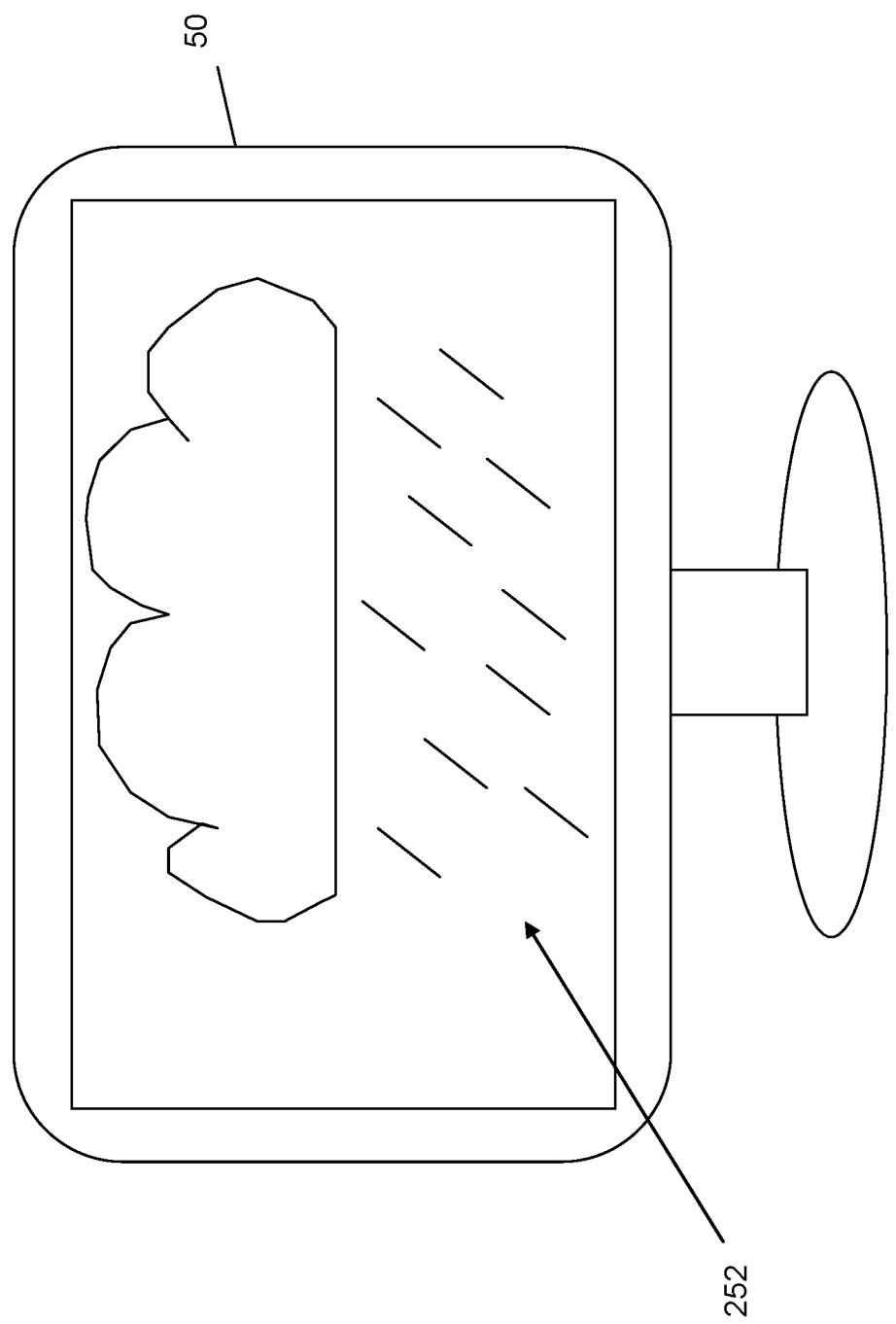

FIGS. 16 and 17 illustrate a computer monitor 50 that displays a conditional screen saver based on the rain/hold state of the irrigation software. When rain, site use, maintenance or a similar an event occurs, an irrigation software user may decide to halt or "hold" an irrigation schedule until the rain or event stops (e.g., by pressing a "hold" button on the software interface). Often, a user may forget that the irrigation schedule has been set to hold or stop all irrigation and therefore may inadvertently prevent irrigation for a longer period of time than desired.

The conditional screen saver helps alert the user to hold status of the irrigation software by displaying several screen savers on the server 12 based on the hold status. For example, screen saver 250 may indicate that the irrigation schedule hold is off, allowing normal irrigation. This screen saver may be a company logo, a sun or even a text message indicating the hold status. Screen saver 252 may indicate that the irrigation schedule hold is on, preventing normal irrigation according to the schedule. This screen saver may be a raining cloud, a circle with a diagonal line through it or a text message indicating the hold status.

When a user modifies the hold status, the irrigation software preferably changes the operating systems screen saver functionality to include the desired text or graphics. Therefore, the server 12 can operate according the screen saver of the rules of the operating system (e.g., Windows, Mac or Linux) while communicating the hold status of the irrigation software.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. An irrigation control system comprising:
   an irrigation controller configured to cause irrigation according to an irrigation watering schedule for a geographic area;
   a rain sensor configured to sense a rain event and communicate said rain event to said irrigation controller;
   wherein said irrigation controller is further configured to:
      halt all currently scheduled irrigation events when said rain sensor communicates said rain event; said currently scheduled irrigation events having an original start time and an original end time;
      create a first recalculated start time for each currently scheduled irrigation events while maintaining said original end time for each of said currently scheduled irrigation events; and,
      periodically create a subsequent recalculated start time while maintaining said original end time for each currently scheduled irrigation events if said rain sensor continues to communicate said rain event to said irrigation controller;
      wherein said irrigation controller will stop periodically creating said subsequent recalculated start time for each currently scheduled irrigation events if said rain sensor stops communicating said rain event or if said original end time has passed.

2. The irrigation control system of claim 1, wherein said recalculated start time is determined based on an amount of rainfall received.

3. The irrigation control system of claim 2, wherein said amount of rainfall received is measure in inches and converted to an irrigation runtime, and wherein said recalculated start time offset by said irrigation runtime.

4. The irrigation control system of claim 1, wherein said irrigation controller is a central irrigation controller in communication with a plurality of satellite irrigation controllers.

5. The irrigation control system of claim 1, wherein said irrigation controller communicates via a two-wire encoder/decoder network connected to a plurality of sprinklers.

6. An irrigation control system comprising:
   an irrigation controller configured to control irrigation according to an irrigation watering schedule for a geographic area;
   said irrigation controller configured to halt current irrigation during a rain event, create a first recalculated irrigation start time and maintaining an irrigation end time while said rain event continues, periodically create a subsequent recalculated start time while maintaining said irrigation end time while said rain event continues, and cease periodically recalculating said irrigation start time when said irrigation end time has passed or when said rain event stops.

7. The irrigation control system of claim 6, wherein said irrigation controller periodically recalculates said irrigation start time to a later time based on an amount of rain that has fallen during said rain event.

8. The irrigation control system of claim 7, wherein said later time is calculated based on a number of inches of rain received during said rain event.

9. The irrigation control system of claim 8, wherein said later time is further calculated based on an amount of time said irrigation control system would take to irrigation said number of inches of rain received during said rain event.

10. The irrigation control system of claim 8, wherein said irrigation controller is a central controller comprising a computer and is further connected to a plurality of satellite irrigation controllers.

11. An irrigation control system comprising:
   a central irrigation controller controlling irrigation according to an irrigation watering schedule for a geographic area;
   said irrigation controller halting currently scheduled irrigation during a rain event, creating first recalculated irrigation start times and maintaining irrigation end times while said rain event continues, periodically creating subsequent recalculated start times while maintaining said irrigation end times, and ceasing to periodically recalculate said irrigation start times when said irrigation end times have passed or when said rain event stops.

12. The irrigation control system of claim 11, wherein said central irrigation controller periodically recalculates said irrigation start time by determining an amount of rainfall that has fallen during said rain event and calculating how long it takes for said irrigation control system to irrigate said amount of rainfall that has fallen during said rain event.

\* \* \* \* \*